US008109850B2

(12) United States Patent
Ammon et al.

(10) Patent No.: US 8,109,850 B2
(45) Date of Patent: Feb. 7, 2012

(54) DRIVE PULLEY FOR ELEVATORS AND METHOD OF MANUFACTURE THEREOF

(75) Inventors: Urs Ammon, Ebikon (CH); Hanspeter Bloch, Buchrain (CH)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 10/827,832

(22) Filed: Apr. 20, 2004

(65) Prior Publication Data

US 2004/0211497 A1 Oct. 28, 2004

(30) Foreign Application Priority Data

Apr. 22, 2003 (EP) .................................... 03405278

(51) Int. Cl.
*F16H 55/36* (2006.01)

(52) U.S. Cl. ........................................................ 474/166

(58) Field of Classification Search .................. 474/166, 474/167, 168, 169, 170, 174, 175, 184, 95–99; 148/639, 642, 567, 72, 320; 74/443, 574.4
See application file for complete search history.

(56) References Cited

U.S. PATENT DOCUMENTS

| | | | | | |
|---|---|---|---|---|---|
| 307,171 | A * | 10/1884 | Bowsher | ......................... | 474/96 |
| 4,013,142 | A * | 3/1977 | Hagg | ............................ | 187/254 |
| 4,553,951 | A * | 11/1985 | Pavone | ......................... | 474/148 |
| 4,591,025 | A * | 5/1986 | Honda | .......................... | 187/266 |
| 5,129,685 | A * | 7/1992 | Engel | ........................... | 285/231 |
| 6,296,721 | B1 * | 10/2001 | Coles et al. | ................... | 148/320 |

FOREIGN PATENT DOCUMENTS

| | | | |
|---|---|---|---|
| DE | 1 042 307 | | 10/1958 |
| DE | 120702 | | 12/1961 |
| DE | 1 162 155 | | 1/1964 |
| DE | 3718647 | C1 * | 6/1988 |

* cited by examiner

*Primary Examiner* — Vicky Johnson
(74) *Attorney, Agent, or Firm* — Wolff & Samson, PC

(57) ABSTRACT

A drive pulley for elevators, with at least two sectors, wherein at least one sector is hardened and at least one sector is not hardened.

12 Claims, 1 Drawing Sheet

DRIVE PULLEY FOR ELEVATORS AND METHOD OF MANUFACTURE THEREOF

BACKGROUND OF THE INVENTION

The invention relates to a drive pulley for elevators and a method of manufacture thereof.

As is known, drive pulleys for elevators are currently made from cast iron (ÖV 200 or ÖV 250) containing lamellar graphite. Hematic grey raw cast iron with an addition of ferrosilicon is usually used as the manufacturing base material for that purpose. After casting is concluded, i.e. after cooling of the casting, a stress-relieving treatment is carried out. Thereafter the drive pulley from the casting is processed to a finished state by stress relief (see, for example, the book by Dr. Verö and Dr. Káldor, *Metallurgie der Eisenlegierungen*, Technischer Buchverlag, Budapest, 1966, pages 282 to 299; or the text book by Dr. Gillemot, *Die Technologie der Konstruktions-Werkstoffe*, Vol. I, Lehrbuch-Verlag, Budapest, 1954).

According to operational experience, drive pulleys produced in accordance with the above technology cannot, even with very gentle operating condition, achieve an acceptable service life, since the far too rapid wear of the cast iron cable grooves by the steel cable obliges premature cable exchange. However, the cost outlay for maintaining the installation is thereby considerably increased, quite apart from the inevitably occurring standstill costs of the elevators, which, particularly in the case of multi-storey residential buildings, produce for the residents inconveniences, losses in time and nuisances which are difficult to tolerate. For the operators of such installations it would be acceptable if the service life of the combination of drive pulley and steel cable would allow at least a use cycle of approximately 10 years. Unfortunately, this desirable parameter value currently cannot even be approximately achieved with drive pulleys of lamellar graphite cast iron.

In drive pulleys, the maximum permissible groove pressure is dependent on the hardness of the groove material. An increase in the usual material hardness of the cable groove, which is made from lamellar graphite as an iron casting, of HB=180 kp/mm$^2$ would also therefore be desirable, since according to currently applicable principles of drive pulley dimensioning the cable is to be assumed to be a continuous surface, but the groove pressure a uniformly distributed load. However, that does not entirely correspond to the actual position, since the loading of the steel cable is not at all to be considered "uniformly distributed", so that "heart stresses" arise at the contact points (of the cable groove and steel cable).

In addition, wear of the drive pulley groove, with otherwise correct design, production, installation and operation in accordance with specifications, is decisively dependent on cable sliding or cable slippage that occurs. The relative speed of the sliding or slippage between cable and groove could, in principle, be prevented by an increase in drive capability, but this imposes a limit on the maximum permissible groove pressure value which in turn is a function of the drive pulley hardness.

A method of producing drive pulleys of elevator installations is known from Patent Specification EP 0 279 896, wherein the outer surface of the drive pulley, at least the cable-guiding groove surfaces, is subjected to a hardening process.

According to a feature of this patent specification, it is of advantage with greater loadings if after the processing of the cable-receiving groove surfaces to finished state these are subjected to a hardening process, preferably a flame process. It is thanks to this measure that, for example, with drive pulleys of the same dimensions and the same casting technology, cable grooves—which are appropriate to the different loading—of different surface hardness can be formed, but still with a relatively low cost outlay.

The hardening of the drive pulley described in Patent Specification EP 0 279 896 increases traction, but the material can embrittle and encourage formation of fractures. These irregularities lead to a shortened service life of the drive pulley. Thus, although the wear resistance of the drive pulley is increased by the hardening, the service life of the drive pulley is, on the other hand, shortened by the propagation of fractures.

SUMMARY OF THE INVENTION

Accordingly, it is an object of the present invention to eliminate this disadvantage and to provide a drive pulley for elevators and a method of manufacture thereof, which drive pulley is hardened and not susceptible to fracturing or does not tend to formation of fractures.

According to the invention this object is fulfilled by a drive pulley which has at least two sectors, wherein at least one sector is hardened and at least one sector is not hardened.

Advantageously the drive pulley is cast or made from one piece. Due to the sectorial hardening of the drive pulley, stresses arising during hardening more easily dissolve and the probability of formation of fractures consequently reduced.

By hardening there is understood here any mechanical, thermal or chemical process which modifies the structure of the material and thereby increases its hardness.

By surface of the drive pulley there is meant here the external cylindrical area of the drive pulley which carries the cable and which is worn during the elevator operation.

The sectors of the drive pulley are here defined as the cylindrical sections of the circle of the drive pulley which are bounded and measured in an angular region from the center of the drive pulley. The angle of the sector is bounded by the two sector sides.

By hardening of a sector there is meant, as well, formation of a thin, hardened layer at the surface of the drive pulley, which lies in the angular range of the sector, or the hardening of the material of this sector under the surface of the drive pulley.

Other features and advantages of the present invention will become apparent from the following description of the invention which refers to the accompanying drawings.

DETAILED DESCRIPTION OF THE INVENTION

Figure 1:
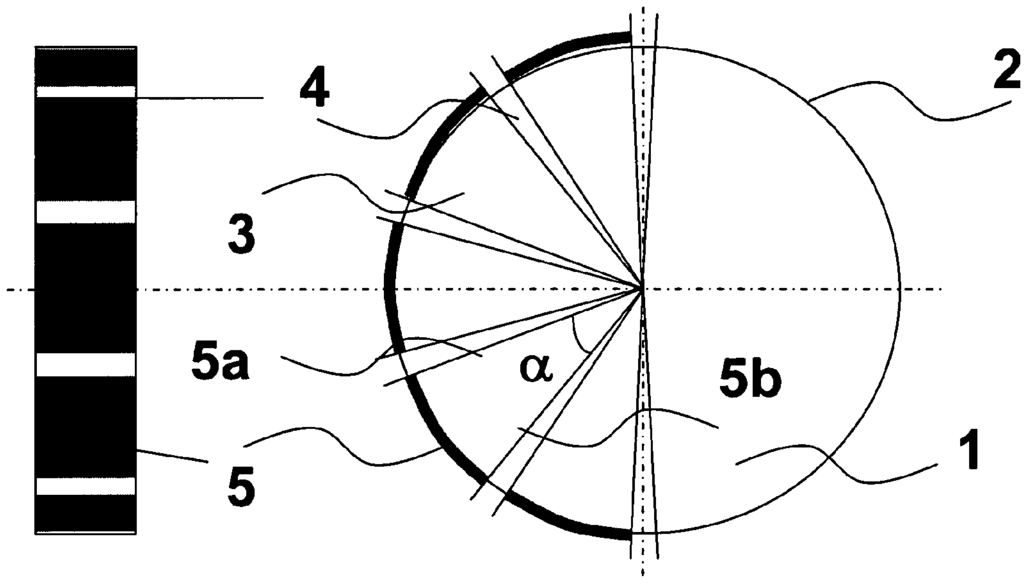
FIG. 1 shows a hardened drive pulley 1 for elevators according to a preferred embodiment of the present invention.

For normal demands, i.e. as an elevator for a residential building of average constructional height, a six-groove drive pulley of 638 mm nominal diameter is made. Hematite basic raw iron, which contains 4.3 to 4.6% of carbon, 0.0015 to 0.05% of manganese, 2.26 to 2.75% of silicon and 0.035 to 0.11% of phosphor, is in known manner the starting point as a basic material.

Ferrosilicon is added in the present case as an alloying material to the molten basic raw iron and contains 73% of silicon, 0.7% of manganese, 0.1% of phosphor and 0.08% of sulfur.

As the next step of the method, the sulfur content of the melt bath is reduced or adjusted to below 0.1%, in the present case to 0.008%. For that purpose there is used magnesium coke which goes into the melt bath at 1480° C. The introduction of the magnesium coke into the melt bath is carried out so that this addition is added below the surface of the melt bath.

The secondary modification with ferrosilicon is carried out, for improvement of the homogeneity of the basic structure, directly before the casting.

The casting follows thereon in the casting mold at 1320° C. Complete cooling down takes place in the sand mold in approximately 9 hours.

Thereafter, the cooled casting is normalized for the purpose of stress relief. In that case, initially the casting is preheated in an oven in a known manner to 920° C. and, after 4 hours of keeping warm at this temperature in the oven, cooled to 900° C. The cooled casting is thereafter processed to finished state in a known manner to the nominal dimensions.

According to the results of tests carried out with drive pulleys produced in the above manner, hardness values of HB=210 to 260 kp/mm$^2$ are measured at the cable guide circumference (with a ball of 10 mm diameter at 30 kN load). The material testing evidenced that the material of the casting has a ferritic/perlitic base (with approximately 30% ferrite, material quality: F30; fineness of the perlite: Pf=1.4), thus is a nodular graphite cast iron with constant graphite form and graphite distribution (the characteristic values for the graphite shape read: Ga 9 to 10; graphite size: Gm 45; (the strength properties of which exceed the standard specifications with respect to GÖV 500, i.e. $R_{p\ 0.2}$=406 to 459 MPa; $R_m$=602 to 658 MPa; $A_5$=2.3 to 3.6%).

The nodular graphite iron contains 2.8 to 3.15% of carbon, 2.8 to 3.1% of silicon, at most 0.3% of manganese, at most 0.2% of phosphate and 0.008% of sulfur.

Such a casting can be more easily stress-relieved than conventional cast iron of lamellar graphite, which for machining tools yields a service life longer by, for example, 30%. However, the cost outlay for a longer service life of the tools is thereby further reduced.

The workpiece is, after processing to finished state, subjected to a subsequent heat treatment with subsequent hardening. This heat treatment has the object of further increasing the hardness of the surface 2 of the drive pulley and, particularly, the hardness of the surface of the grooves and at the same time of avoiding the formation of fractures.

This heat treatment of the groove surface is carried out by hardening or by a flame hardening performed at 850° C. In that case the drive pulley, or the grooves thereof, rotating at a regulable rotational speed is or are heated all at once by a special gas torch. The heat-treated groove region is thereafter immediately cooled down, for example by rotating the drive pulley. Through the speed of rotation, i.e. through to the rpm of the drive pulley, the thickness of the hardened layer 5 of the groove surface can be regulated, which in a preferred embodiment amounts to 1 to 1.5 mm. The desired degree of heat glow can in practice be established and identified on the basis of color (cherry red).

The hardening is carried out sectorially. FIG. 1 shows, by way of example, the hardened layer 5 of a sector with an angular range a. The angle a is bounded by the sector sides 5*a* and 5*b*.

A sector 3 of the drive pulley, which lies in an angular range a of 25° measured from the center, is initially hardened. The adjoining sector 4 of the drive pulley, which lies in an angular range of 5° measured from the center, is then, thereagainst, not hardened. The sectorial hardening of the angular regions is carried out over the entire circumference of the drive pulley, i.e. 12 times 25° hardened separated by 12 times 5° unhardened. The drive pulley thus ultimately consists of a regular sequence of hardened and non-hardened sectors. The sectors of the drive pulley are, according to the preferred present embodiment of the invention, hardened and non-hardened sequentially around the entire circumference of the surface of the drive pulley. A simultaneous hardening of all sectors is also, in principle, conceivable. In addition, irregular sequences of hardened and unhardened sectors are possible.

The measured groove hardness values are HB=480 to 500 kp/mm$^2$ for the hardened sectors. Such values give, in the case of the loads encountered in practice, for the operator a long service life, which is satisfactory for the operator, and the security of economic operation.

Going beyond its advantages already mentioned in the foregoing, there is still an important advantage of this invention that there can be produced for the different load conditions, by the same, universally usable technology, drive pulleys which then in case of need can be subjected to the above-described surface hardening method after processing to the finished state. Thus, the respective optimum surface hardness and wear resistance can, however, be set, since the nodular graphite material structure brought about by the method according to the invention does indeed offer a possibility for that. As a consequence of the use of a drive pulley with a longer service life according to the invention and improved wear resistance, a weight saving is achieved.

According to operational results, elevator drive pulleys produced in accordance with the above method have at normal loading, i.e. in the case of a residential building of average height with eight storeys, a substantially increased wear resistance by comparison with the conventional elevator drive pulleys and accordingly can be operated for a substantially longer time. As a consequence, however, the sum of obligatory standstill times can be substantially reduced.

Instead of flame hardening there can also be used induction hardening of the surface of the drive pulley, which leads to similar results.

The depth of the hardened material can be varied as desired. In the minimum case, only a thin layer of the drive pulley surface is hardened, which amounts to a few microns. In the extreme case, an entire sector of the drive pulley is hardened, wherein the hardened zone reaches to the center of the drive pulley.

The sectorially hardened drive pulleys of elevator drives find use independently of the drive type, i.e. with gearing, without gearing or belt transmission.

All geometric variants of the sectorial hardening, i.e. number of segments, angular division, etc., can be presented and lead to positive results independently of the production method of the drive pulley and the hardening process or the conditions and means thereof.

A reduction in the formation of fractures is effected for all possible groove shapes of the drive pulley.

Independently of the selection of material of the drive pulley, which also need not be cast material, the sectorial hardening over the circumferential surface of the drive pulley as well as a segmental hardening through of the drive pulley have a positive effect.

In addition, the hardened segments can lie perpendicularly to the cable groove or they can lie at an angle, thus diagonally with respect to the drive pulley surface. The same hardening is also possible with two-part cable pulleys, wherein a subsequent processing, i.e. a regrinding of the grooves, is necessary in order to ensure running smoothness in the case of high-speed elevators.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A drive pulley for elevators, comprising an axis of rotation, and a circumference within a plane perpendicular to the axis of rotation, wherein the circumference comprises a cable carrying surface having at least two sectors and wherein at least one sector is hardened and one sector is not hardened.

2. The drive pulley for elevators according to claim 1, wherein the at least two sectors are formed from the same alloy.

3. The drive pulley for elevators according to claim 2, wherein the drive pulley in its entirety is formed from a single alloy.

4. The drive pulley for elevators according to claim 1, wherein the at least one hardened sector has an angular range of 15°-35°.

5. The drive pulley for elevators according to claim 1, wherein the at least one not hardened sector has an angular range of 1°-15°.

6. The drive pulley for elevators according to claim 1, wherein the at least one hardened sector is at least one of induction hardened and flame hardened.

7. The drive pulley for elevators according to claim 1, wherein the circumference has a regular sequence of hardened and not hardened sectors.

8. A method for producing a drive pulley for an elevator, which drive pulley has an axis of rotation and a circumference within a plane perpendicular to the axis of rotation, the circumference having a cable carrying surface, the method comprising the steps of:

hardening at least one sector of the cable carrying surface; and maintaining at least one sector of the cable carrying surface unhardened.

9. The method according to claim 8, including hardening at least one sector in an angle range of 15°-35°.

10. The method according to claim 8, including maintaining at least one sector unhardened in an angular range of 1°-15°.

11. The method according to claim 8, including hardening at least one sector by at least one of induction hardening and flame hardening.

12. The method according to claim 8, wherein the sectors of the drive pulley are hardened and not hardened sequentially around the entire circumference of the drive pulley.

* * * * *